(12) United States Patent
Laugharn, Jr. et al.

(10) Patent No.: US 8,702,836 B2
(45) Date of Patent: *Apr. 22, 2014

(54) METHODS AND APPARATUS FOR TREATING SAMPLES WITH ACOUSTIC ENERGY TO FORM PARTICLES AND PARTICULATES

(75) Inventors: James A. Laugharn, Jr., Winchester, MA (US); Edwin Rudd, Salem, NH (US)

(73) Assignee: Covaris, Inc., Woburn, MA (US)

( * ) Notice: Subject to any disclaimer, the term of this patent is extended or adjusted under 35 U.S.C. 154(b) by 1570 days.

This patent is subject to a terminal disclaimer.

(21) Appl. No.: 11/986,274

(22) Filed: Nov. 20, 2007

(65) Prior Publication Data

US 2012/0144905 A1    Jun. 14, 2012

Related U.S. Application Data

(60) Provisional application No. 60/860,598, filed on Nov. 22, 2006.

(51) Int. Cl.
*B22F 9/04* (2006.01)
*G10K 11/26* (2006.01)

(52) U.S. Cl.
USPC ............... 75/345; 75/354; 241/1; 366/116

(58) Field of Classification Search
USPC ................. 75/345, 354; 366/116; 241/1
See application file for complete search history.

(56) References Cited

U.S. PATENT DOCUMENTS

| | | |
|---|---|---|
| 1,734,975 A | 11/1929 | Loomis et al. |
| 2,447,061 A | 8/1948 | Franklin |
| 2,565,159 A | 8/1951 | Williams |
| 2,578,505 A | 12/1951 | Carlin |
| 2,585,103 A | 2/1952 | Fitzgerald |
| 2,632,634 A | 2/1953 | Williams |
| 2,700,894 A | 2/1955 | Valkenburg |
| 2,738,172 A | 3/1956 | Spiess, Jr. et al. |
| 2,855,526 A | 10/1958 | Jones |
| 2,864,592 A | 12/1958 | Camp |
| 2,916,265 A | 12/1959 | Towne |

(Continued)

FOREIGN PATENT DOCUMENTS

| | | |
|---|---|---|
| DE | 2557668 | 6/1977 |
| DE | 19534955 | 3/1996 |

(Continued)

OTHER PUBLICATIONS

"Early experience with high-intensity focused ultrasound for the treatment of benign prostatic hypertrophy", Sullivan et al, British Journal of Urology, vol. 79 pp. 172-176, dated 1997.

(Continued)

*Primary Examiner* — George Wyszomierski
(74) *Attorney, Agent, or Firm* — Wolf, Greenfield & Sacks, P.C.

(57) ABSTRACT

The invention relates to a method of forming solid particles from a sample, which includes the step of exposing the sample to a focused acoustic field having an acoustic wave variable, until the solid particles achieve a desired state of particularization. The acoustic wave variable may be selected based, at least in part, on the desired state of particularization. The sample may be exposed to the focused acoustic field through a medium.

37 Claims, 1 Drawing Sheet

(56) References Cited

U.S. PATENT DOCUMENTS

| | | | |
|---|---|---|---|
| 2,950,725 A | | 8/1960 | Jacke et al. |
| 2,980,345 A | * | 4/1961 | Kececioglu et al. ............... 241/1 |
| 3,066,686 A | | 12/1962 | O'Neill |
| 3,194,640 A | | 7/1965 | Nesh |
| 3,292,910 A | | 12/1966 | Martner |
| 3,396,286 A | | 8/1968 | Anderson et al. |
| 3,481,186 A | | 12/1969 | Erwin et al. |
| 3,604,270 A | | 9/1971 | Falk |
| 3,614,069 A | | 10/1971 | Murry |
| 3,743,523 A | | 7/1973 | Bodine |
| 3,807,704 A | | 4/1974 | Janzen et al. |
| 3,837,805 A | | 9/1974 | Boucher |
| 3,876,890 A | | 4/1975 | Brown et al. |
| 3,919,558 A | | 11/1975 | Brouillette et al. |
| 3,958,559 A | | 5/1976 | Glenn et al. |
| 4,028,933 A | | 6/1977 | Lemons et al. |
| 4,059,098 A | | 11/1977 | Murdock |
| 4,123,681 A | | 10/1978 | Barlow |
| 4,307,964 A | | 12/1981 | Dudgeon et al. |
| 4,350,917 A | | 9/1982 | Lizzi et al. |
| 4,395,652 A | | 7/1983 | Nakanishi et al. |
| 4,444,146 A | | 4/1984 | DeWitz et al. |
| RE31,779 E | | 12/1984 | Alliger |
| 4,488,816 A | | 12/1984 | Vota |
| 4,541,281 A | | 9/1985 | Chubachi et al. |
| 4,571,087 A | | 2/1986 | Ranney |
| 4,644,808 A | | 2/1987 | Lecoffre |
| 4,764,905 A | | 8/1988 | Granz et al. |
| 4,834,124 A | | 5/1989 | Honda |
| 4,862,060 A | | 8/1989 | Scott et al. |
| 4,879,011 A | | 11/1989 | Schram |
| 4,889,122 A | | 12/1989 | Watmough et al. |
| 4,926,871 A | | 5/1990 | Ganguly et al. |
| 4,960,877 A | | 10/1990 | Sagai et al. |
| 4,983,189 A | | 1/1991 | Peterson et al. |
| 5,015,929 A | | 5/1991 | Cathignol et al. |
| 5,026,167 A | | 6/1991 | Berliner, III |
| 5,037,481 A | | 8/1991 | Bran |
| 5,330,680 A | * | 7/1994 | Sakawaki et al. ............... 516/32 |
| 5,348,002 A | | 9/1994 | Caro |
| 5,368,054 A | | 11/1994 | Koretsky et al. |
| 5,395,592 A | | 3/1995 | Bolleman et al. |
| 5,409,594 A | | 4/1995 | Al-Jiboory et al. |
| 5,484,573 A | | 1/1996 | Berger et al. |
| 5,509,420 A | | 4/1996 | Ohtomo et al. |
| 5,523,058 A | | 6/1996 | Umemura et al. |
| 5,585,565 A | | 12/1996 | Glascock et al. |
| 5,601,526 A | | 2/1997 | Chapelon et al. |
| 5,623,095 A | | 4/1997 | Beller |
| 5,631,425 A | | 5/1997 | Wang et al. |
| 5,639,423 A | | 6/1997 | Northrup et al. |
| 5,653,816 A | | 8/1997 | Ekberg |
| 5,674,742 A | | 10/1997 | Northrup et al. |
| 5,681,396 A | | 10/1997 | Madanshetty |
| 5,688,406 A | | 11/1997 | Dickinson et al. |
| 5,714,318 A | | 2/1998 | Sagner et al. |
| 5,736,100 A | | 4/1998 | Miyake et al. |
| 5,759,162 A | | 6/1998 | Oppelt et al. |
| 5,779,985 A | | 7/1998 | Sucholeiki |
| 5,803,099 A | | 9/1998 | Sakuta et al. |
| 5,813,074 A | | 9/1998 | Liljeholm |
| 5,831,166 A | | 11/1998 | Kozuka et al. |
| 5,834,648 A | | 11/1998 | Wang et al. |
| 5,890,802 A | | 4/1999 | Evensen et al. |
| 5,962,338 A | | 10/1999 | Sucholeiki |
| 5,993,671 A | | 11/1999 | Peltzer |
| 6,003,388 A | | 12/1999 | Oeftering |
| 6,010,316 A | | 1/2000 | Haller et al. |
| 6,039,309 A | | 3/2000 | Kuklinski |
| 6,039,694 A | | 3/2000 | Larson et al. |
| 6,042,556 A | | 3/2000 | Beach et al. |
| 6,086,821 A | | 7/2000 | Lee |
| 6,100,084 A | | 8/2000 | Miles et al. |
| 6,210,128 B1 | | 4/2001 | Rife et al. |
| 6,216,538 B1 | * | 4/2001 | Yasuda et al. ............... 73/570.5 |
| 6,224,778 B1 | | 5/2001 | Peltzer |
| 6,244,738 B1 | | 6/2001 | Yasuda et al. |
| 6,277,332 B1 | | 8/2001 | Sucholeiki |
| 6,284,113 B1 | | 9/2001 | Bjornson et al. |
| 6,291,180 B1 | | 9/2001 | Chu |
| 6,311,702 B1 | | 11/2001 | Fishkin |
| 6,361,747 B1 | | 3/2002 | Dion et al. |
| 6,413,783 B1 | | 7/2002 | Wohlstadter et al. |
| 6,440,725 B1 | | 8/2002 | Pourahmadi et al. |
| 6,515,030 B1 | | 2/2003 | Bechtel et al. |
| 6,591,680 B2 | | 7/2003 | Batzinger et al. |
| 6,699,711 B1 | | 3/2004 | Hahn et al. |
| 6,719,449 B1 | | 4/2004 | Laugharn, Jr. et al. |
| 6,737,021 B2 | | 5/2004 | Watari et al. |
| 6,869,551 B2 | * | 3/2005 | Lee et al. ............... 264/9 |
| 6,948,843 B2 | | 9/2005 | Laugharn, Jr. et al. |
| 7,108,137 B2 | * | 9/2006 | Lal et al. ............... 209/659 |
| 7,211,927 B2 | | 5/2007 | Puskas |
| 7,329,039 B2 | | 2/2008 | Laugharn, Jr. et al. |
| 7,481,918 B2 | | 1/2009 | Morrison et al. |
| 7,491,527 B2 | | 2/2009 | Yuan et al. |
| 7,521,023 B2 | | 4/2009 | Laugharn et al. |
| 7,686,500 B2 | | 3/2010 | Laugharn et al. |
| 7,687,026 B2 | | 3/2010 | Laugharn et al. |
| 7,687,039 B2 | | 3/2010 | Laugharn et al. |
| 7,757,561 B2 | | 7/2010 | Laugharn et al. |
| 2003/0165482 A1 | | 9/2003 | Rolland et al. |
| 2004/0026804 A1 | * | 2/2004 | Gupta et al. ............... 264/7 |
| 2004/0054286 A1 | | 3/2004 | Audain et al. |
| 2004/0076545 A1 | | 4/2004 | Watari et al. |
| 2004/0264293 A1 | | 12/2004 | Laugharn et al. |
| 2005/0142664 A1 | | 6/2005 | Loney |
| 2005/0150830 A1 | | 7/2005 | Laugharn et al. |
| 2005/0165139 A1 | * | 7/2005 | Kawakami et al. ............... 524/17 |
| 2005/0235740 A1 | | 10/2005 | Desie et al. |
| 2006/0029525 A1 | | 2/2006 | Laugharn et al. |
| 2006/0158956 A1 | | 7/2006 | Laugharn et al. |
| 2007/0053795 A1 | | 3/2007 | Laugharn et al. |
| 2008/0031094 A1 | | 2/2008 | Laugharn et al. |
| 2008/0050289 A1 | | 2/2008 | Laugharn et al. |
| 2008/0056960 A1 | | 3/2008 | Laugharn et al. |
| 2009/0000639 A1 | | 1/2009 | Tribelsky et al. |
| 2009/0095685 A1 | | 4/2009 | Morrison et al. |
| 2009/0211615 A1 | | 8/2009 | Ho |

FOREIGN PATENT DOCUMENTS

| | | |
|---|---|---|
| DE | 19617924 | 11/1997 |
| DE | 19756874 A1 | 6/1999 |
| DE | 19820466 | 11/1999 |
| DE | 10325307 | 7/2004 |
| EP | 0643982 | 3/1995 |
| EP | 0709136 A1 | 1/1996 |
| EP | 0707892 A1 | 4/1996 |
| EP | 1128185 | 8/2001 |
| EP | 1344562 | 9/2003 |
| GB | 1015962 | 1/1966 |
| GB | 1536693 | 12/1978 |
| WO | WO 199502456 | 1/1995 |
| WO | WO 199858417 | 12/1998 |
| WO | WO 200025125 | 5/2000 |
| WO | WO-2006033307 | 3/2006 |
| WO | WO-2007016605 | 2/2007 |

OTHER PUBLICATIONS

"A prototype of a 500kHz ultrasonic Matricidal Device: Beam Scanner, Application to in-vivo heel bone quantitative characterization", Defontaine et al, 1999 IEEE Ultrasonics Symposium, pp. 1585-1588, dated 1999.

"A new method for the generation and use of focused ultrasound in experimental biology", as submitted on Jul. 6, 1942, Lynn et al., The Journal of General Physiology, vol. 26, The Rockefeller University Press, pp. 179-193, copyright 1942.

"Some applications of Ultrasonics", Brockelsby, J. Sci. Instrum., vol. 40, pp. 153-156, dated 1963.

Steven V. Ley and Caroline M. R. Low, Ultrasound in Synthesis, Springer-Verlag 1989, pp. 18-28.

(56) References Cited

OTHER PUBLICATIONS

European Search Report and Office Action from European Application No. Ep 07 02 2472 dated Jan. 15, 2009.
International Search Report and Written Opinion from International Patent Application PCT/US2004/040133 dated Apr. 20, 2005.
Office Action mailed Dec. 09, 2008 for U.S. Appl. No. 11/167,934.
Office Action mailed Jul. 02, 2008 for U.S. Appl. No. 11/167,934.
Office Action mailed Jun. 12, 2008 for U.S. Appl. No. 10/777,014.
Office Action mailed Jan. 16, 2008 for U.S. Appl. No. 10/777,014.
Office Action mailed Oct. 22, 2007 for U.S. Appl. No. 10/777,014.
Office Action mailed Mar. 29, 2007 for U.S. Appl. No. 10/777,014.
Office Action mailed Mar. 23, 2006 for U.S. Appl. No. 10/777,014.
Office Action mailed Sep. 19, 2005 for U.S. Appl. No. 10/777,014.
Office Action mailed Nov. 03, 2008 for U.S. Appl. No. 11/894,805.
Office Action mailed Mar. 24, 2009 for U.S. Appl. No. 11/497,865.
"A new method for the generation and use of focused ultrasound in experimental biology", as submitted on Jul. 06, 1942, Lynn et al., the Journal of General Physiology, vol. 26, the Rockefeller Univesity Press, pp. 179-193, copyright 1942.
"A prototype of a 500kHz ultrasonic Matericial Device: Beam Scanner, Application to in-vivo heel bone quantitative characterization", Defontaine et al, 1999 IEEE Ultrasonics Symposium, pp. 1585-1588, dated 1999.
"Early experience with high-intensity focused ultrasound for the treatment of benighn prostatic hypertrophy", Sullivan et al, Brithish Journal of Urlology, vol. 79 pp. 172-176, dated 1997.
Notice of Allowance in related application no. 11/006,002.

* cited by examiner

METHODS AND APPARATUS FOR TREATING SAMPLES WITH ACOUSTIC ENERGY TO FORM PARTICLES AND PARTICULATES

RELATED APPLICATIONS

This application claims the benefit of U.S. Provisional Application No. 60/860,598, filed Nov. 22, 2006, the specification of which is hereby incorporated herein by reference in its entirety.

FIELD OF THE INVENTION

The invention generally relates to the field of using controlled acoustic energy emitting devices for treating material to form particles and particulates. The particles and particulates are typically of a desired state of particularization, for example, of controlled size, composition, and/or structure.

BACKGROUND

Solid particles, particularly small particles of controllable size and composition, find utility in a variety of industries. Among other advantages, particles of controlled size and composition provide for greater consistency and predictability in handling and use. For example, small particles of controlled size possess favorable flow characteristics and exhibit little variation in interparticle behavior. When such particles are used in conjunction with a chemical process, uniformity in particle size allows the particles to behave consistently, an attribute that is especially advantageous for the pharmaceutical industry, where the particle size can affect the dissolution rate, bioavailability, and overall stability of the agent.

Various approaches for attaining small and uniform particles have been employed. Conventional comminuting techniques such as crushing, grinding, and milling, rely on mechanical forces that introduce the possibility of contamination, destruction of important biological or chemical properties, and variation in particle size. Alternatively, particles of a controlled size may be produced using conventional precipitation/crystallization methods. The methods, however, often require toxic solvents, resulting in wet particles that require drying, and may also produce particles of considerable size variation. In some instances, supercritical fluid technology, such as the rapid expansion of supercritical solutions is employed. Although use of supercritical fluid technology enables the production of relatively small particles of uniform size, such methods rely on nozzles and tubes for delivering their solution. Thus, systems employing supercritical fluid technology are limited in their scope of use. Low frequency, long-wavelength, unfocused acoustic systems have also been used. However, typically in such systems the variation in particle size is high, the processes are time-consuming, and the reproducibility is poor. Accordingly, improved techniques for generating particles using acoustic energy under controlled conditions are needed.

SUMMARY

The invention provides methods and systems for selectively exposing a sample or samples to acoustic energy, e.g., in a benchtop, laboratory, or industrial setting, for the purpose of generating solid particles or particulates. In certain embodiments, the processes described herein provide particles or particulates of controlled size, or suspensions containing particles or particulates of controlled size. The particles of controlled size may be of substantially uniform size. The uniformly sized particles or particulates may have an average diameter, for example, in the range of millimeters, micrometers, nanometers, or picometers, e.g., such that at least 90% or even at least 95% of the particles have a diameter within 50%, 40%, 30%, 25%, 20%, 15%, 10%, 5% or even 2% of the average diameter of the particles.

The term "acoustic energy" used herein refers to acoustic energy, acoustic waves, acoustic pulses, including forms of ultrasonic energy and/or shock waves. As used herein, sonic energy/acoustic energy refers to the focused, high frequency (e.g., typically 100 kHz-100 MHz; greater than 500 kHz; greater than or approximately equal to 1 MHz; etc.), short wavelength (e.g., approximately 1-1.5 mm) acoustic energy. In contrast to the acoustic energy used in the methods of the present invention, sonication is generally used in the art to refer to the application of unfocused, relatively low frequency (typically 15-20 kHz), long wavelength (7-10 cm) energy used for material conditioning and/or processing. As used herein, focal zone or focal point means an area where sonic energy converges and/or impinges on a target, although that area of convergence is not necessarily a single focused point. According to one aspect, the present invention provides an acoustic energy source that can be a focused transducer having a focal length, which generates an ellipsoidal focal zone. The focused transducer may be spherical, ellipsoidal, or any other suitable shape. The acoustic focal length of the focused transducer may be any suitable length, e.g., from 1-65 mm or more in diameter. The focal zone resulting from the focused transducer may be between 1 millimeter and 2 centimeters in diameter, e.g., between 1 mm and 100 mm, or between 1 mm and 10 mm, and the axial length of the focal zone may be between 1 millimeter and 6 centimeters, for example, depending on the size of the sample vessel.

In one aspect, the present invention provides an apparatus that can generate solid particles or particulates of controlled size, or suspensions containing particles or particulates of controlled size. The device may provide a reservoir in which to place sample of solid material, a sample comprising a solid and liquid phase, a solution of a solute dissolved in a solvent, or any other suitable sample, as will be understood from the description that follows. Acoustic radiation is applied to the sample in order to produce particles or particulates of controlled size, and/or, where a liquid phase is also present, to produce a suspension containing particles or particulates of controlled size.

In certain embodiments, the apparatus is a benchtop apparatus. In other embodiments, the apparatus is a high-throughput automatic apparatus, e.g., that may provide a reservoir in which sample material is automatically input, for example by a conveyor belt or robot arm. In yet other embodiments, the apparatus may be a reactor chamber that processes samples introduced to the system, e.g., in one or more batches or in a continuous flow, according to a varying succession of procedures. The apparatus may be configured to process the samples introduced to the system with little user input. The processing may be determined in accordance with a preprogrammed procedure. The processing may also be selected according to the composition of the sample or the desired result, e.g., particle size.

In certain embodiments, in particular where the apparatus is a reactor chamber, the apparatus may be used to perform a reaction involving one or more soluble or sparingly soluble reactants that generate a solid product that precipitates out of solution. The solid product that precipitates out of solution may be, for example, a drug compound. In certain embodiments, the apparatus may allow a reaction or reactions to be performed as a continual process, e.g., with starting materials being added and product being removed from an active reaction.

In certain embodiments, an apparatus of the invention may include an interchangeable memory component for storing treatment protocols. Interchangeable memory components can include memory cards, flash drives, CDs, DVDs, CD-ROMs, diskettes, chips, and any other suitable memory storage device. Treatment protocols may be preprogrammed, adjust to inputs from the user, adjust to measured changes in the sample during the treatment process, be based on initial conditions or characteristics of the sample, and/or be configured manually by the user. Operation of the apparatus can be at least partially automated. Steps that may be automated include selecting treatment parameters, selecting a treatment protocol, initiating acoustic treatment, and monitoring of sample parameters during treatment.

For example, the acoustic energy delivered to the sample may be adjusted by a controller or processor according to information received by sensors, e.g., relating to the volume of the sample, the sample temperature, and/or the type, size, or concentration of particulate matter in the sample, for the purpose of, for example, comminuting the particles. The sensors may include temperature sensors, pressure sensors, optical sensors, such as infrared sensor, microscopes and/or video cameras, lasers, acoustic sensors such as electromagnetic or piezoelectric sensors, or a combination of such sensors. The sensors may be arranged coaxially or at an angle to each other.

Sensors may be employed for measuring a physical characteristic of one or more samples before, during and/or following acoustic treatment of the samples. The results of the measured characteristic can be stored for use in subsequent processing steps or to compile a treatment history for the sample(s). For example, samples may be selected for further processing or interchanged for other samples based on their previously measured characteristics, or samples may be grouped and/or classified based on treatment history. Similarly, a characteristic measured post-treatment can be assessed by itself or can be compared to the characteristic measured pre-treatment and used to determine whether a desired condition of the sample, such as the presence of particles of a desired size or the substantially even dispersion of particles in a liquid, has been reached and/or to assign a subsequent treatment or processing step for the sample.

The samples may be coupled to the acoustic energy source of an apparatus by one or more liquid, semi-solid or solid mediums. For example, the acoustic transducer may be placed in a tray surrounded by a fluid with a high transmissivity for the acoustic energy, and a semi-solid or solid layer may be placed between the fluid and the sample to prevent direct contact between the sample and the fluid. The semi-solid or solid layer may be made of silicone gel, elastomeric polyurethane, thermoplastic elastomer and the like, and may also have an additional cover layer to further protect the sample from contamination. Pressure may be applied to the sample or to the medium transmitting the acoustic energy, for example, by pressurizing the fluid, to improve acoustic coupling between the acoustic energy source and the sample. In an example of an embodiment with more than one coupling medium, the samples may be coupled to the acoustic energy by a fluid coupled to a solid (e.g., silicone) pad.

BRIEF DESCRIPTION OF THE DRAWINGS

Objects and advantages of the invention will be apparent upon consideration of the following detailed description, taken in conjunction with the accompanying drawings, in which like reference characters refer to like parts and in which.

DESCRIPTION OF ILLUSTRATIVE EMBODIMENTS AND EXAMPLES

Figure 1:
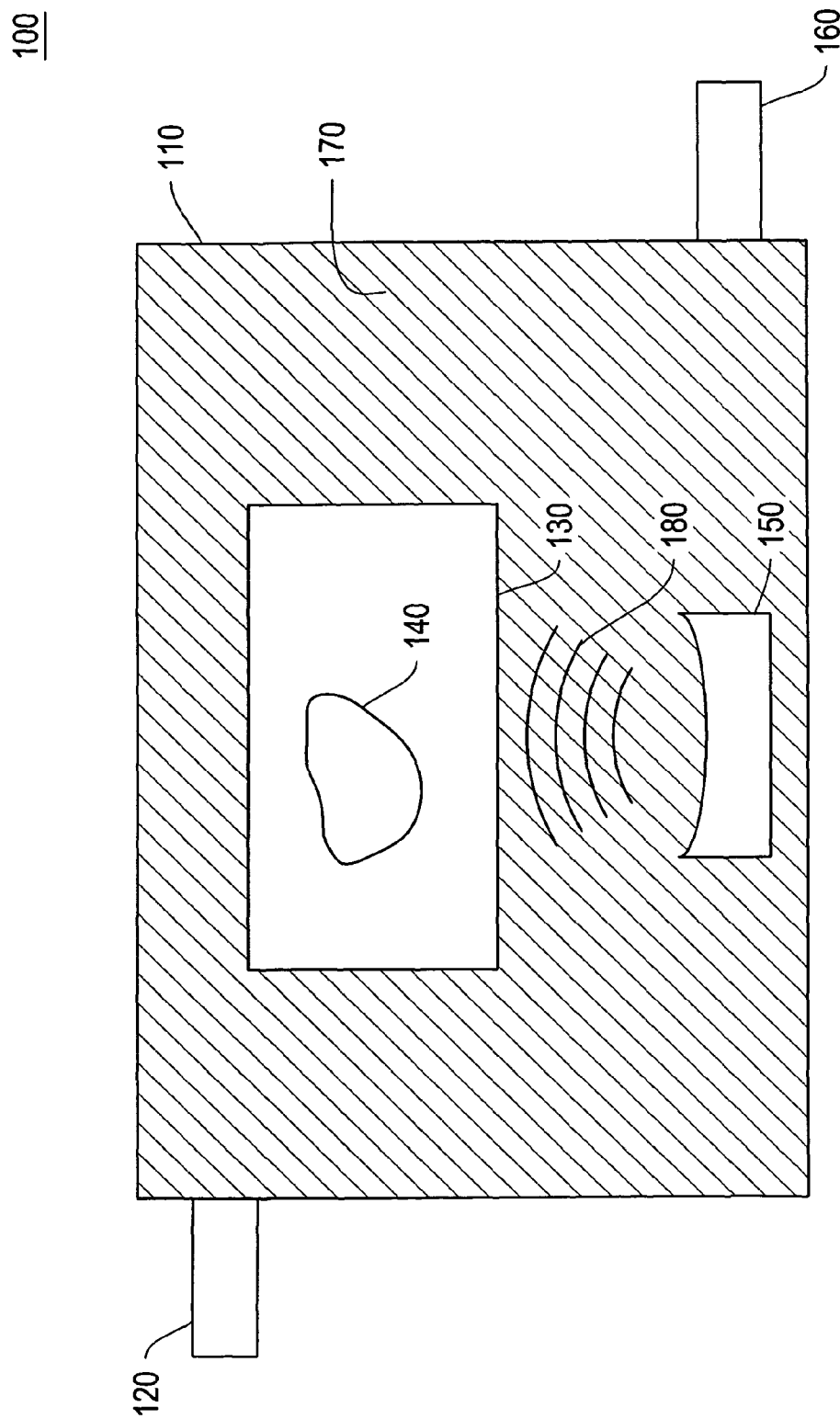
FIG. 1 depicts an exterior view of an apparatus for treating samples with acoustic energy to form particles and particulates.

Generally, the present application discloses systems and methods for generating particles, particulates, or suspensions of solid materials by applying acoustic energy to one or more samples. In certain embodiments, acoustic energy is applied to a solid sample, e.g., in a liquid or gaseous environment, to form particles of the solid material. For example, the application of acoustic energy to a solid can cause it to break apart into increasingly smaller fragments. Similarly, acoustic energy can agitate sample pieces or particles, inducing collisions that promote further fracturing and/or fragmenting of the solids. In other embodiments, acoustic energy is applied to a liquid sample, thereby inducing the formation of particles. For example, acoustic energy can be applied to a supersaturated solution, causing a solute to precipitate out of solution. Alternatively, acoustic energy can be applied to a biphasic liquid sample, inducing mixing of the phases and causing the precipitation of a solid. Similarly, acoustic energy can be applied to a hot solution in conjunction with cooling, so that solids that precipitate during cooling are formed into particles of a desired size. Generally, the subject systems and methods can be applied to any procedure that results in the formation of a solid material in order to control the size and size distribution of the solid material that forms.

FIG. 1 depicts an embodiment of a treatment chamber 100 for processing a sample or samples 140. The treatment chamber 100 may be adapted for use by a lab operator, a manufacturing process, a computer interface, or any combination or permutation of users both human and nonhuman. The treatment chamber 100 may be accessed through input 120. Input 120 may include a cover, conveyor belt, robot arm, or any such means for introducing a sample into the treatment chamber 100. The treatment chamber 100 has at least one acoustic source 150. The acoustic source 150 may direct acoustic energy at sample or samples 140. A sample container 130, which can be any suitable container or vessel, can be substantially surrounded by a coupling medium 170 that is contained within a sample vessel 110. Suitable containers or vessels include tubes, vials, aerosol vials, flasks, jars, bottles, wells, arrays, blister packs, ampoules, pouches, bags, envelopes, and other containers that are capable of containing a sample under sonication conditions. The coupling medium 170 may be a liquid bath, gas mixture, gel, elastomer compound, or any medium suitable to transfer acoustic energy from the acoustic source 150 to the sample container 130. The coupling medium 170 may also be a compound coupling medium, such as a gel coupled to a solid pad. As will be discussed in greater detail below, different coupling mediums are more or less efficient and effective in transferring acoustic energy to the sample.

The acoustic energy may then cause particles or particulates satisfying a desired state of particularization, e.g., particles of controlled size, to form in sample 140, or induce the formation of suspensions containing particles or particulates, e.g., of controlled size. The particles or particulates in the suspensions may be of substantially uniform size. The uniformly sized particles or particulates may have an average diameter. In some embodiments, the particles are in the range of millimeters, micrometers, nanometers, or picometers such that, for example, at least 90% or even at least 95% of the particles have a diameter within 50%, 40%, 30%, 25%, 20%, 15%, 10%, 5% or even 2% of the average diameter of the particles (e.g. having a diameter between 20 micrometers+/−2 micrometers or between 10 nm+/−5 nm). In other words, a sample achieving a desired state of particularization may have solid particles such that at least some predetermined percentage of the particles has a diameter falling within a predetermined range. The particles may have an average diameter that is about 1, 2, 5, 10, 20, 50, 55, 59, 75, 100, 150, 200, 300, 400, 500, or 750 picometers, about 1, 2, 5, 10, 20, 50, 55, 59, 75, 100, 150, 200, 300, 400, 500, or 750 nanometers, about 1, 2, 5, 10, 20, 50, 55, 59, 75, 100, 150, 200, 300, 400, 500, or 750 micrometers, about 1, 2, 5, 10, 20, 50, 55, 59, 75, 100, 150, 200, 300, 400, 500, or 750 millimeters, or a diameter intermediate between any of these values. The particles may be spherical, ellipsoidal, irregular, or any suitable shape. In certain embodiments, the diameter is the physical diameter. In such embodiments, the diameter of a nonspherical particle is the largest linear distance between two points on the surface of the particle. In various embodiments, particles may be carbon nanotubes, drug crystals, or particles of any other suitable compound; in certain embodiments, particles may also include mixed compositions, such as solid dispersions, solutions, aggregates, or any suitable mixed composition. The desired state of particularization may depend on a desired purpose or use for the articles. Foe example, a desired average diameter of the particles and/or a desired consistency of size of the particles may depend on a desired dissolution rate, desired diffusivity rate, or a desired chemical process for which the particles will be used. The particles or particulates may then be collected at output 160. Output 160 (which may, in some embodiments, be the same opening as input 120) may include a robot arm, conveyor belt, or any such device in which the particles can be retrieved by the user.

In embodiments where sample 140 is a solid, the acoustic energy 180 may break the sample into smaller fragments in the sample container 130. In certain embodiments, sample 140 comprises a solid and a liquid in which the solid is poorly soluble or insoluble, such that exposure to acoustic energy 180 does not cause the solid to dissolve in the liquid, but instead causes the solid to fragment and/or form a suspension in the liquid. In such embodiments, the liquid may serve as a coupling medium to the solid material in the sample 140 and improve the efficiency, consistency, and/or reproducibility of the fragmentation process.

In embodiments where sample 140 is a liquid, particles or particulates may be formed out of the sample 140 in the sample container 130. For example, if the liquid is supersaturated, the acoustic energy 180 may cause a solute to precipitate out of solution. In an alternative example, where the sample is a biphasic liquid, the acoustic energy 180 may induce a mixing of the phases and cause a precipitation of a solid. Similarly, sample container 130 may be cooled, e.g., by the coupling medium or other suitable cooling system, such that if, for example, sample 140 is a hot, saturated solution, a solid may precipitate during cooling and the acoustic energy 180 causes the solid to form into particles of a desired size. Thus, for example, the acoustic coupling medium may also function as a cooling bath or pad.

In various embodiments, non-fluidic coupling mediums may be used as the coupling medium 170. The acoustic energy 180 can be transmitted through a viscous (semi-solid) layer of, for example, silicone gel or elastomer, or other material with a gel consistency or rubber consistency, which may optionally be sealed by an impervious membrane such as, for example, a plastic sheet or film, to form a laminate. Exemplary suitable sound-transmitting media are listed in Table 1. This list, however, should not be viewed as comprehensive and exhaustive, and other acoustic coupling media with adequate sound transmission properties may be used instead. In this arrangement, the treatment vessel may be pressed against the coupling medium 170 for more efficient transfer of acoustic energy. In one embodiment, the cover of the apparatus may be configured to provide this pressure by having an interior portion of the cover of the apparatus disposed in contact with the treatment vessel when the cover is closed, such that the treatment vessel is pressed against the coupling medium 170. To adjust for different treatment vessel sizes while still applying pressure, the interior portion of the cover may be coupled to a spring, a bellows-like structure, an elastic material, a foam, or any other structure which can be compressed but also resists being compressed. Coupling medium 170 may be free-floating on the fluid surface of a fluid bath or may be suitably supported in other ways, such as by making the membrane of the laminate of coupling medium 170 in contact with a fluid bath more rigid, by a lattice frame or the like.

Table 1 below lists the relative acoustic transmission of various materials relative to water (100%):

TABLE 1

| Material | Thickness (in mm) | Transmission at 1 MHz (in % relative to water) |
|---|---|---|
| No material (water) |  | 100 |
| Acetate | 0.13 | 80 |
| Latex | 0.10 | 50 |
| PET (Mylar) | 0.13 | 90 |
| Silicone | 0.13 | 95 |
| PET (Mylar) | 0.05 | >95 |

Suitable materials for sample 140 may include, for example, pharmaceutical agents and/or excipients (e.g., in crystalline or amorphous form); polymers; macromolecules, such as carbon nanotubes and fullerenes; metals, metal oxides, and salts, such as magnetite, iron, and iron oxide; bases such as sodium hydroxide; surfactants such as benzalkonium chloride, cocamidopropyl betaine, and oleyl alcohol; and crystalline materials such as graphite and diamond. The crystal structure and/or lattice integrity of the sample materials may influence the outcome of breakup of the sample into particles or particulates by the apparatus, in terms of treatment parameters needed to obtain a desired result or the result of a particular treatment protocol. Thus, in some embodiments, doping of crystalline sample materials may facilitate breakup into particles or particulates or may otherwise affect the results of acoustic treatment. In the case of polymer samples, the polydispersity index of the sample may determine whether it is desirable for a surfactant to be used in addition to the sample.

An ultrasound acoustic field 180 can be generated by the acoustic energy source 150, for example, a focused piezoelectric ultrasound transducer, into the coupling medium 170. The wavelength of the acoustic energy may be, for example, between 1 and 100 mm. This short wavelength may allow the acoustic energy field to be focused into a localized area of the sample 140, i.e., the focal zone, which will be described in detail below. In certain embodiments, the frequency and wavelength of acoustic energy field 180 are selected to allow the sample 140 to be treated isothermally. In addition, the frequency and wavelength of acoustic energy field 180 may allow for the controlled convergence of mechanical energy at a predetermined location, e.g., in the sample 140. For example, the frequency and wavelength of acoustic energy field 180 may be selected such that the acoustic energy penetrates the sample container 130 prior to achieving a peak energy density within sample 140.

The focused transducer may be spherical, ellipsoidal, or any other suitable shape. The acoustic focal length of the focused transducer may be any suitable length, e.g., from 1-65 mm or more in diameter. The focal zone resulting from the focused transducer may be between 1 millimeter and 2 centimeters in diameter, e.g., between 1 mm and 100 mm, or between 1 mm and 10 mm, and the axial length of the focal zone may be between 1 millimeter and 6 centimeters, for example, depending on the size of the sample vessel. The focal zone may be a variety of other sizes as detailed in U.S. Pat. No. 6,719,449. The acoustic energy source 150 is positioned so that the focal zone is proximate the surface of the coupling medium 170. The acoustic energy source 150 can be driven by an alternating voltage electrical signal generated electronically by a control system.

Sensors can be used prior to, during, or after the acoustic treatment to analyze the samples and/or detect certain physical properties of the sample, for example, by measuring responses to electromagnetic stimulation, such as optical spectroscopy, energy dispersion, scattering absorption, and/or fluorescence emission. The sensors may also detect initial characteristics of the sample like size, particulate components and characteristics, solubilization level, and type. Other measurable variables can include electromagnetic properties, such as electrical conductivity, capacitance or inductivity, as well as other physical parameters, such as sample uniformity or pattern analysis. Exemplary sensors may include an additional ultrasonic acoustic transducer suitable to transmit and/or receive an acoustic probe interrogation beam which can be used to assess one or more characteristics, such as the fill level, temperature, cavitation, homogeneity (e.g., presence or absence of particulate matter in the solvent, and/or the size of such particles), volume, etc., of the sample located within the treatment vessel. It will be understood by those skilled in the art that the roles of the acoustic energy source 150 and the sensor transducer can be reversed in that the sensor transducer may operate to emit the acoustic processing beam while the acoustic energy source 150 performs sensing function. The system may include other types of sensors as well, such as an infrared (IR) temperature sensor to measure the sample temperature.

Interfaces, such as an interface between air and water, cause reflection of an incident ultrasound field. While reflection should be minimized for transmitting acoustic energy to the sample, a signal emitted from the acoustic energy source 150 or from a separate sensor and reflected by an interface, such as the meniscus of the sample within the treatment vessel, can be used to quantify the height and therefore also the volume of the sample. In one embodiment, the sensor may be implemented as an acoustic transducer and emit a short burst of acoustic energy with a duration of 1 ms or less for interrogating the sample. Such short burst is also referred to as a "ping." As mentioned above, the interrogation burst can be focused on the sample. Due to reflection at the various interfaces encountered by the propagating interrogation sound wave, the sensor receives a return signal after a transit time proportional to the distance between the sensor and the respective interface. For example, it takes a sound wave approximately 7 microseconds to travel a distance of 1 cm, which is easily resolved by a detection system. The height location of the meniscus of the sample can then be determined from the arrival time difference between the sound wave reflected at the bottom of the sample, and the reflection at the liquid-air interface at the meniscus. The volume of the sample can be taken into consideration when applying acoustic energy for treatment of the sample.

Likewise, air bubbles and particulates can also block or reflect energy transmission through the sample volume. The same principle described above for determining the position of the meniscus can therefore also be used to evaluate the sample volume for the presence or absence of particulates, and/or the size and/or amount of such particles.

The treatment chamber 100 may include a control system that can include a computer and a user input/output device or devices such as a keyboard, display, printer, etc. The control system may be linked with the treatment chamber 100 to drive the acoustic energy source 150, e.g., with a positioning system to drive stepper motors that may position the sample container 130 or acoustic energy source 150, with one or more sensors to detect and measure process parameters and/or sample characteristics, and/or with one or more controllers, such as a target pressure controller, to alter conditions to which the sample 140 is exposed. A controller can also be linked with the control system to regulate temperature of the coupling medium 170.

The control system can specify a process to be performed upon a sample. In this regard, the treatment chamber 100 can include an arbitrary waveform generator that drives an RF amplifier, such that the acoustic energy source 150 receives an input. The output signal of the RF amplifier may be conditioned by an impedance matching network and input to the acoustic energy source 150. The control system can generate a variety of useful alternating voltage waveforms to drive an acoustic energy source. For instance, a high power "treatment" interval consisting of about 5 to 1,000 sine waves, for example, at 1.1 MHz, may be followed by a low power "convection mixing" interval consisting of about 1,000 to 1,000,000 sine waves, for example, at the same frequency. "Dead times" or quiescent intervals of about 100 microseconds to 100 milliseconds, for example, may be programmed to occur between the treatment and convection mixing intervals. A combined waveform consisting of concatenated treatment intervals, convection mixing intervals, and dead time intervals may be defined by the operator or selected from a stored set of preprogrammed waveforms. The selected waveform may be repeated a specified number of times to achieve the desired treatment result.

A memory can include preprogrammed waveforms, protocols, and functions from which a computer can select when determining a treatment process. Protocols can include combined or alternating waveforms and any other instructions for any actuating systems. The instructions are preferably predetermined to be advantageous for effecting a specific objective, such as enhancing a reaction, solubilizing the sample, or sterilization, for a specific sample type, which may be dependent on the sample contents, size, temperature, viscosity, level of solubility, vessel, or any other characteristics. Functions can configure a coordinated set of instructions for the actuating systems or select a protocol based on input collected by the computer. The input can be initial characteristics of the sample and/or process parameters that can be detected by sensors or entered by an operator via the user interface. For instance, a function can, given the volume and contents of a sample, determine the necessary waveform, duty cycle, and length of treatment to mix a sample without significant heating side effects. Other processing variables the function can determine include frequency, energy delivered, burst pattern, intensity, cycles per burst, pulse shape of the waveform, maximum energy level, etc. The computer can select a process to implement based on a combination of user input from the user interface and/or information from the sensors. The user interface allows an operator to design and specify a process to be performed upon a sample. In particular, the operator can directly control instructions to actuating systems, select an option from the memory, indicate characteristics of the sample and an objective, or some combination thereof. The user interface can also communicate to the operator which treatment process options are available and data detected by the sensors. Information from the sensors can be used to configure a treatment process, to select a treatment process, or as feedback to a treatment process.

In one embodiment, measurable or discernible process attributes such as sample temperature, water bath temperature, intensity of acoustic cavitation, visible evidence of mixing in the sample vessel 110, and visible evidence of the granularity and/or amount of sample fragmentation into particles or particulates in the sample vessel 110, may be monitored by the control system and employed in feedback loop to modify automatically during the treatment process any parameters controlled by actuating systems, such as the treatment waveform or acoustic energy source position. The modification of the treatment waveform may be a proportional change to one or more of the waveform parameters or a substitution of one preprogrammed waveform for another. For instance, if the sample temperature deviates excessively during treatment from a set-point temperature due to absorbed acoustic energy, the control system may proportionally shorten the treatment interval and lengthen the convection mixing interval in response to the discrepancy between the actual and target sample temperatures. Or, alternatively, the control system may substitute one predetermined waveform for another. The control system may be programmed to terminate a process when one or more of the sensors signal that the desired process result has been attained.

The sample container 130 and/or the acoustic energy source 150 may be capable of moving in the sample vessel 110, and their positions may each be controlled by the control system of the automatic ultrasonicator. The sample container 130 may be arranged so that it is aligned with the acoustic energy source 150, or vice versa. The acoustic source 150 may include a sensor configured to detect information about the sample 140. For example, the sample 140 could be labeled with a radio frequency identification tag, text, a barcode, a symbol, or any other type of identifying mark, which the sensor could recognize using an RFID interrogator, optical recognition, acoustic recognition, or any other suitable means. In certain embodiments, the sample 140 could be marked using a special ink, a reflective material, or other distinguishing features that could be recognized using the sensor. The sample container 130 may contain a receptacle or clasp coupled to a scale to measure the mass of sample 140. The treatment chamber 100 may have other sensors or interrogation systems capable of detecting characteristics of the sample 140. For instance, the treatment chamber 100 may detect an identifying mark, the location of the treatment vessel, the level of fluid in the treatment vessel, or any other initial characteristics of the sample 140.

In certain embodiments, the treatment chamber 100 may also automatically devise and then execute a treatment protocol for the sample 140. The preprogrammed treatment protocols can be configured to each achieve a different objective, such as sterilization, mixing, reaction enhancement, producing particles or particulates of a controlled size, and any other application of acoustic treatment. The preprogrammed treatment protocols may also be directed to control the size, granularity, or quantity of the particles or particulates produced. Each preprogrammed treatment protocol can also be configured to correspond to a particular sample to be fragmented into particles or particulates, where the control system uses the characteristics of a particular sample either detected by sensors of the treatment chamber 100 or from information entered by the operator via a user interface. For example, if the sensors determine that a sample consisting of a metal is present, the acoustic energy 180 is adjusted so that the metal sample fragments into particles or particulates of a controlled size. In yet another embodiment, the operator can input information about the sample, such as the sample size, treatment vessel, and desired objective, and then the control system automatically selects and executes a treatment protocol based on the information from the operator. The treatment protocol may include adjusting the amount of acoustic energy 180 in order to fragment the sample into particles or particulates. The operator may also input acceptable ranges for any measured sample characteristics or parameters, such as temperature and pressure, which can help guide the control system's selection of a treatment protocol for breaking the sample into particles or particulates. In yet another embodiment, the operator can adjust the treatment protocol during the treatment process, for instance by lowering or raising the duty cycle, modifying the waveform, and/or switching to a different treatment protocol. The adjustment may be performed in order to control the size, granularity, or quantity of particles or particulates produced during the treatment process. The operator may also designate whether or not the treatment protocol should feed back information about the sample from sensors during the treatment process to adjust the treatment protocol. The control system can make feedback adjustments according to instructions from a preprogrammed treatment protocol and/or input from the operator.

Treatment protocols and similar instructions for treating samples may be stored on a memory component of the control system. In some cases it may be advantageous to store treatment protocols that are relatively specialized to specific uses, sample types, or objectives. The memory component may be fixed to the automatic ultrasonicator 100, such as a silicon chip or other hardware component, or may be configured to be readily removable and exchanged for other memory components, e.g., such that the operator can select a memory component comprising treatment protocols pertinent to the needs of the operator. For example, as improved protocols are developed, the operator can also acquire newer memories including these improved protocols. The interchangeable memory component can be a memory card that slides through a memory card slot. Alternatively, the memory card can be similar to a flash drive. Other suitable interchangeable memory components include compact discs (CDs), compact discs with read-only memory (CD-ROMs), digital versatile discs (DVD), diskettes, flash drives, and memory chips. In one embodiment, the automatic ultrasonicator 100 can download treatments protocols from the interne, either onto an interchangeable memory component separable from the automatic ultrasonicator 100, directly to a memory component built into the automatic ultrasonicator 100, or to an ActiveX or other controller.

The treatment chamber 100 may be adapted for use in a benchtop ultrasonicator apparatus, a high throughput automatic ultrasonicator apparatus, an ultrasonicator reactor apparatus, or any other apparatus where acoustic energy is desired to break up a sample or samples into particles or particulates.

In one embodiment, the subject methods can be performed using a benchtop ultrasonicator apparatus that can generate particles or particulates of controlled size, or suspensions containing particulates of controlled size, with manual input from the user. The uniform particles, particulates, or suspensions containing uniform particles or particulates may be generated from samples that the user provides to the apparatus. The user may also provide information to the apparatus. The information may be descriptive information about the composition of the sample or descriptive information about how the user would like the apparatus to process the sample.

In another embodiment, the subject methods can be performed using a high throughput automatic ultrasonicator apparatus that can generate particles or particulates of controlled size, or suspensions containing particulates of controlled size, with little input from the user. The uniform particles, particulates, or suspensions containing uniform particles and particulates may be generated from samples that are provided as input to the apparatus. Providing the samples to the apparatus may be automatic, for example by a conveyor belt or a robot arm. The apparatus may process the samples introduced to the system with little user input. The processing may be determined in accordance with a preprogrammed procedure. The processing may also be selected according to the composition of the sample.

In yet another embodiment, the subject methods can be performed using an ultrasonicator apparatus that can generate particles or particulates, e.g., of controlled size, or suspensions containing particulates, e.g., of controlled size, through a reaction process. In certain embodiments, reactants may be added to the reactor, treated with acoustic energy, and processed to obtain the desired product, e.g., in a batch fashion. In other embodiments, a feed steam of reactants may be continually added to the input of the reactor, the resulting mixture may be treated with acoustic energy, and uniform particles, particulates, or suspensions containing uniform particles may be continually collected at the output. Other configurations include varying the rate that reagents are added into the reactor, varying the temperature of the reaction chamber, and/or varying the rate that product is dispersed from the output of the apparatus.

The treatment chamber 100 may be used in a benchtop ultrasonicator apparatus. The benchtop ultrasonicator apparatus may be sized to fit on and be supported by a table or bench in a laboratory setting. The sample 140 may be placed within a sample container 130 by a lab user/researcher via input 120. The sample container 130 may include a vessel containing the sample 140. Suitable treatment vessels include tubes, vials, aerosol vials, flasks, jars, bottles, wells, arrays, blister packs, ampoules, pouches, bags, envelopes, and other containers that are manipulable by the operator and capable of containing a sample under sonication conditions. In certain embodiments, the sample container 130 can be a concavity or depression having a shape similar to an outer surface of the treatment vessel, such that the treatment vessel can nest within the concavity or depression. The sample container 130 can include a clamp, clip, or any other suitable fastener capable of holding the treatment vessel in place, e.g., around the neck of a flask or bottle, or around the body of a jar or tube. In certain embodiments, the user may manually direct the sonication of the sample via a user interface on the exterior of the apparatus through any number of dials, buttons, or levers. Alternatively, the benchtop ultrasonicator may prompt the user via the user interface to select or devise a treatment protocol. When the sample has been processed to the user's satisfaction, the processed sample may be collected at the output 160 of the benchtop ultrasonicator 100 by the user.

The treatment chamber 100 may also be used in a high throughput automatic ultrasonicator. A sample or samples 140 may be provided to the input 120 of the automatic ultrasonicator. The introduction of the sample 140 may be automatic, for example via a conveyor belt or a robot arm coupled to the input 120 of the automatic ultrasonicator. The sample 140 may arrive at the input 120 in a hermetically sealed vial, pouch, or any such container in which the sample introduced to the high throughput automatic ultrasonicator may resist contamination by external influences. The acoustic energy 180 may then cause particles or particulates, e.g., of controlled size, to form into sample 140, or suspensions containing particles or particulates of controlled size. The acoustic energy 180 may be applied to the sample with little user input. Alternatively, the acoustic energy 180 may be determined in accordance with a preprogrammed procedure. The acoustic energy 180 may also be selected according to the composition of the sample. When the sample 140 is finished being processed by automatic ultrasonicator 100, the processed sample may be collected at the output 160. The output may then be automatically transported, for example with a conveyor belt or robot arm, to be used in another procedure. Output 160 may be hermetically sealed vial, pouch, or any suitable sealed container; in this way, particles and particulates can be formed in a sealed sample without any physical intervention that might compromise the sterility of the sample.

The treatment chamber 100 may also be used in an ultrasonicator reactor. The interior of the ultrasonicator reactor can have a sample container 130 which may be a reactor cavity of any suitable shape or design, e.g., specially shaped (e.g., like a tube or other cylindrical chamber) for carrying out a continuous flow reaction, fitted with inlets and outlets for transferring material into and out of the vessel, and/or having other features adapted to the particular process to be carried out. The reactor cavity may be formed from any of a variety of materials including metals, glass, and polymers. The rate of reagents fed into the input 120 of the ultrasonicator reactor may vary based on desired reaction conditions. The reactor cavity can be substantially surrounded by a coupling medium 170 that is contained within a reactor tank 110. The coupling medium 170 may be a fluid bath. The reactor tank 110 may also be suspended within a second fluid bath. Acoustic energy source 150 may transmit acoustic energy to the mixture of reagents in the sample vessel 110 via the coupling medium 170. The acoustic energy may then aid in a reaction in the sample container 130 to produce a product. Production rates of the reactor may vary from nanoliters to liters per minute. Output 160 may be coupled to another system such that the output produced by ultrasonicator reactor 100 is used in a continuous flow reactor type system.

Systems as described above can be used for acoustic treatment of pharmaceutical agents, whether currently known or hereafter discovered, as discussed in U.S. Pat. No. 6,859,551. These compounds may be naturally occurring or chemically synthesized. In particular, particles of such compounds may be for use in inhalation therapy, as in, for example, a dry powder inhaler. Inhalation therapy is of particular interest for those active agents that are problematic when administered orally, e.g., by causing gastrointestinal distress and/or possessing variable rates of absorption. Pulmonary drug delivery relies on inhalation of a drug dispersion or aerosol by a patient so that the active agent within the dispersion can reach the alveoli of the lungs for absorption into blood circulation. As discussed in U.S. Pat. No. 5,740,794, pulmonary delivery is well suited for the delivery of proteins and polypeptides, which are sometimes difficult to deliver using other methods. Since drug release rate is directly related to the surface area and size of a particle containing the drug, precise control of the particle size is particularly important in regulating the rate of drug release. In addition, the optimal particle size for rapid drug absorption through alveolar membranes to bring about a desired pharmacokinetic effect is on the order of 100 nm or smaller. Thus, it would be advantageous to use the disclosed invention to prepare drug compounds for pulmonary drug delivery.

In accordance with one aspect of the invention, the systems and methods described above can be used to manufacture batches of pharmaceutical agents. The manufacturing process may be automated, and may produce large batches of the pharmaceutical agents for industrial use. The manufacturing process may take place as part of a completely sterile process. For example, a solution of a drug compound may be prepared, sterilized, and distributed into one or more hermetically sealed containers. The hermetically sealed containers may be provided, e.g., in an automated high-throughput manner, to the input 120 of the treatment chamber 100, and processed by acoustic energy 180 in order to produce particles or particulates in the hermetically sealed containers without risk of contaminating the solution. Sample container 130 or any surrounding acoustic coupling medium may concurrently heat or cool the samples 140 during the process in order to achieve particles or particulates of different composition. The processed hermetically sealed containers containing particles or particulates may then be provided at the output 160 of the treatment chamber 100 so that they may be used commercially or in another manufacturing process.

In addition, particles of pharmaceutical agents may be of particular use in oral therapy, as in, for example, pharmacological pills and powders. These pills and powders may be more easily administered to young or elderly than conventional methods. Oral therapy is also of particular interest for those active agents that may require quick dissolution and absorption. Suspensions containing particles of pharmaceutical agents may be of particular use, such as creams and topical formulations. The creams and topical formulations may have particular dermatological advantages. Suspensions containing particles of pharmaceutical agents may also be of particular use in administering injections, for example intravenous (IV) injections and depot injections. IV injections with such suspensions may be advantageous due to the small amount of excipient required to form the suspension.

In accordance with another aspect of the invention, systems and methods described above can be used to reduce particle size of insoluble or poorly soluble drug particles and/or to modify the surface of such particles, e.g., with surfactants or with a polymer coating, such as a controlled release or enteric coating. The insoluble or poorly soluble drug particles may be suspended in water. Acoustic energy may be used to process the suspended particles until they have been reduced to the desired size range. The particles may be modified, e.g., with surfactant(s), through application of acoustic energy in the presence of a suitable agent, thereby reducing the reaction time required for modification, e.g., by at least 10%, 25%, 50%, or more. The surfactants could either be synthetic (e.g., Tween 80), or natural (e.g., phospholipids): For example, aliquots of water soluble surfactants may be added to the particles and the suspension may be treated acoustically until the desired level of surface modification is achieved. Similarly, surfactants that are poorly soluble in water may be dissolved in alcohol, and small aliquots of such a solution may be added to the particles.

In another embodiment of the invention, suitable to efficiently process larger masses of drug(s) and greater volume suspensions (i.e., greater than 50 ml), a two-step, flow-through system could be used. In such a system, the particle suspension may be pumped from a reservoir through a sample container as described herein, e.g., in a continuous flow process. In certain embodiments, it may be advantageous to recirculate the outflow from the sample container back though the system until the desired size range is reached. Conventional techniques, such as conventional sonication or coarse grinding or milling of the drug particles may also be employed to produce an initial particle suspension suitable as a starting material for the flow system, e.g., so that the suspension can be effectively pumped through the system in a substantially continuous manner.

In addition, another application is the acoustic treatment of carbon nanotubes, as discussed in U.S. Pat. No. 7,008,605. Carbon nanotubes (CNTs) are allotropes of carbon that have unique properties that make them useful in a wide variety of applications such as nanotechnology, electronics, and optics. Cutting of CNTs, such as physically chopping CNTs to create shorter CNTs, may be useful in aiding the assembly of nanostructures for applications in material science or electronics. Cutting of CNTs may be achieved by sonicating a suspension of CNTs in a suitable medium such as liquid or molten hydrocarbons. One such preferred liquid is 1,2-dichloroethane. In addition, sonication may be used to create defects along the rope lengths of CNTs. These defects may aid in grafting together CNTs to aid in the assembly of various nanostructures.

Systems as described above can be used for acoustic treatment of solid material to form abrasives. These abrasives may have industrial use, for example sandpapers, or for cosmetic use, such as toothpastes.

Those skilled in the art will know, or be able to ascertain using no more than routine experimentation, many equivalents to the embodiments and practices described herein. Accordingly, it will be understood that the invention is not to be limited to the illustrative embodiments disclosed herein. Other illustrative devices, systems, methods, applications, and features of the invention are described in the following, which are herein incorporated by reference in their entirety:

U.S. Pat. No. 6,719,449 entitled "Apparatus and Method for Controlling Sonic Treatment."

U.S. application Ser. No. 11/001,988, filed Dec. 2, 2004, and entitled "Apparatus and Methods for Sample Preparation."

U.S. Pat. No. 6,948,843 entitled "Method and apparatus for acoustically controlling liquid solutions in microfluidic devices."

U.S. Pat. No. 6,869,551 entitled "Precipitation of solid particles from droplets formed using focused acoustic energy."

U.S. Pat. No. 6,719,449 discloses apparatuses and methods for exposing a sample to acoustic energy and for selectively controlling acoustic energy and/or the location of the sample relative to acoustic energy that may be used in conjunction with the invention disclosed herein. In particular, U.S. Pat. No. 6,719,449 discloses various acoustic energy sources, electronics and waveforms, positioning systems, sensors, control systems, treatment vessels, materials for treatments, and applications of acoustic treatment.

U.S. application Ser. No. 11/001,988 discloses systems, methods, and devices relating to processing a sample that may be used in conjunction with the invention disclosed herein. In particular, U.S. application Ser. No. 11/001,988 discloses various sample vessels and systems and methods for collecting, stabilizing, fragmenting and/or analyzing samples.

U.S. Pat. No. 6,948,843 discloses systems, methods, and devices relating to coupling acoustic energy to a sample vessel to lower acoustic energy requirements to obtain desired process results, such as mixing.

U.S. Pat. No. 6,869,551 discloses systems and methods related to solid particles of controlled size, composition, and/or structure from a solution containing at least one compound of interest.

The subject matter discussed above can readily be adapted for use in the systems and methods discussed in the above references. It should be noted that Applicants consider all operable combinations of the disclosed illustrative embodiments to be patentable subject matter including combinations of the subject matter disclosed in the above references.

The following examples are put forth so as to provide those of ordinary skill in the art with a complete disclosure and description of how to implement the invention, and are not intended to limit the scope of what the inventors regard as their invention:

EXAMPLE 1

The example below demonstrates the use of focused acoustic energy in the preparation of magnetic particles by co-precipitation of $Fe^{+2}/Fe^{+3}$ with an excess base. The example is based on Example 1 of U.S. Pat. No. 5,389,377.

An iron salts solution was prepared by dissolving 0.25 g of $FeCl_2.H_2O$ and 0.41 g of $FeCl_3$ in 10 ml of water. A 1 N NaOH solution was prepared by dissolving 4.0 g of NaOH in 100 ml of water. Magnetic particles were precipitated out of solution using acoustic energy from a sonicating apparatus in two treatments.

In treatment 1, the apparatus treated the sample for two successive thirty second periods at 20% duty cycle with an intensity setting of 10 at 200 cycles per burst and 22° C. 0.6 ml of 1 N NaOH was placed in a vial, then the vial was placed in the sonicating apparatus. A syringe containing 0.6 ml of iron salts solution was used to inject the solution into the base in the vial while the acoustic treatment was in progress. This yielded black particles that were attracted to a magnet.

In treatment 2, the apparatus treated the sample for two successive thirty second periods at 20% duty cycle with an intensity setting of 10 at 200 cycles per burst and 42° C. 0.6 ml of iron salts solution was again injected into 0.6 ml of base as in treatment 1 above, but a slower injection rate was used. This yielded larger clumps of black particles that were attracted to a magnet.

EXAMPLE 2

The example below demonstrates the use of focused acoustic energy to coat ferromagnetic particles with sodium citrate.

200 ul of the particle suspension from treatment 1 in example 1 above were washed twice with $dH_2O$ using magnetic separation. The resulting pellet of ferromagnetic material was resuspended in approximately 600 ul of 0.5 N trisodium citrate. The resulting sample was treated with acoustic energy in the apparatus for sixty seconds at 5% duty cycle with an intensity setting of 10 at 200 cycles per burst and 43° C.

This yielded a brown transparent suspension, indicating that the magnetic particles had been dispersed as fine particles approximately 10 nm in size. The particles did not settle out over time, indicating that the particles were at least partially coated with citrate which would electrostatically stabilize the magnetic particles in suspension. Using conventional high heat or mechanical milling methods to similarly coat the magnetic particles takes a longer period of time. Thus, the acoustic treatment rapidly and successfully coated and dispersed magnetic particles prepared by the co-precipitation method.

EXAMPLE 3

The example below demonstrates the use of focused acoustic energy to reduce the size of ceramic hydroxyapatite particles.

Ceramic hydroxyapatite particles roughly 20+/−2 micrometers in diameter were suspended in 70 ml of 50 mM trisodium citrate, 2 mg of particles/ml. Five ml of this suspension was transferred to a 20×125 mm round bottom screw cap culture tube and the tube was placed in an acoustic treatment chamber. The suspension was treated with acoustic energy at 20% duty cycle with an intensity setting of 10 and 200 cycles per burst at a bath temperature of 10-12° C. After approximately 5 minutes of treatment, an aliquot of the suspension was examined with a microscope. It was observed that approximately ninety percent of the particles were now in the 0.4-4 um size range.

What is claimed is:

1. A method of forming solid particles from a sample, comprising exposing the sample to a focused acoustic field having a frequency of between about 100 kilohertz and about 100 megahertz, a focal zone having a diameter of less than about 2 centimeters and at least one acoustic wave variable until the solid particles achieve a desired state of particularization, wherein the desired state of particularization is a state where at least 90% of the solid particles has a diameter within at most about 50% of an average diameter of solid particles formed from the sample, wherein the sample comprises a solid and exposing the sample to the focused acoustic field results in the solid fragmenting into smaller pieces to form the solid particles.

2. The method of claim 1, wherein the at least one acoustic wave variable is selected based, at least in part, on the desired state of particularization.

3. The method of claim 1, comprising detecting a characteristic of the sample, wherein the at least one acoustic wave variable is selected, at least in part, based on the detected characteristic.

4. The method of claim 1, comprising
detecting a characteristic of the sample, and
modifying at least one acoustic wave variable of the focused acoustic field based, at least in part, on the detected characteristic to achieve the desired state of particularization.

5. The method of claim 4, wherein the detected characteristic of the sample is at least one of a volume of the sample, a sample temperature, a size of solid particles in the sample, a quantity of solid particles in the sample, an electromagnetic property, a solubilization level of the sample, an intensity of acoustic cavitation, a sample homogeneity and an identifying mark.

6. The method of claim 1, comprising controlling a temperature to which the sample is exposed while the sample is exposed to the focused acoustic field.

7. The method of claim 1, wherein at least about 95% of the solid particles have a diameter within at most about 50% of an average diameter of solid particles formed from the sample.

8. The method of claim 1, wherein at least 90% of the solid particles have a diameter within at most about 30% of an average diameter of solid particles formed from the sample.

9. The method of claim 1, wherein at least 90% of the solid particles have a diameter within at most about 10% of an average diameter of solid particles formed from the sample.

10. The method of claim 1, comprising receiving user input, wherein the at least one acoustic wave variable is selected, at least in part, based on received user input.

11. The method of claim 1, wherein the sample comprises a liquid and exposing the sample to the focused acoustic field results in particles precipitating out of the liquid.

12. The method of claim 11, wherein the exposing the sample to the focused acoustic field results in formation of a suspension.

13. The method of claim 1, wherein the sample comprises a solid and a liquid.

14. The method of claim 1, further comprising pressurizing the sample while the sample is exposed to the focused acoustic field.

15. The method of claim 1, wherein the exposing the sample to the focused acoustic field comprises flowing the sample through a focal zone of the focused acoustic field.

16. The method of claim 1, wherein the sample comprises at least one of a pharmaceutical agent, a polymer, a macromolecule, a metal, a salt, a base, a surfactant, and a crystalline material.

17. The method of claim 16, wherein the sample comprises a surfactant and the surfactant comprises at least one of benzalkonium chloride, cocamidopropyl betaine and oleyl alcohol.

18. The method of claim 16, wherein the sample comprises a crystalline material and the crystalline material comprises a doped crystalline structure.

19. The method of claim 1, wherein the at least one acoustic wave variable comprises at least one of a waveform, a duty cycle, a length of treatment, a frequency, a total energy delivered, a burst pattern, an intensity, a cycles per burst, a pulse shape of the waveform, and a maximum energy level.

20. The method of claim 1, wherein the sample is exposed to the focused acoustic field through a coupling medium, the coupling medium comprising at least one of a liquid, a gel, an elastomer, a thermoplastic, a solid, a semi-solid and a viscous material.

21. The method of claim 1, wherein the sample includes surface modified particles.

22. The method of claim 1, further comprising:
flowing the sample through an inlet into a sample container;
acoustically processing the sample by flowing the sample through the focal zone of the focused acoustic field; and
flowing the sample through an nutlet from the sample container.

23. The method of claim 22, further comprising re-circulating the sample back through the sample container and acoustically processing the sample by flowing the sample back through the focal zone of the focused acoustic field.

24. The method of claim 23, wherein re-circulating the sample back through the sample container repeats until the sample comprises solid particles having the desired state of particularization.

25. The method of claim 1, wherein the focused acoustic field has a frequency of greater than 500 kilohertz.

26. The method of claim 1, wherein the focal zone has a diameter of between 1 millimeter and 2 centimeters.

27. The method of claim 1, wherein exposing the sample to the focused acoustic field comprises acoustically processing the sample in a continuous flow system.

28. The method of claim 26, wherein acoustically processing the sample in a continuous flow system comprises pumping the sample through the continuous flow system.

29. The method of claim 1, wherein exposing the sample to the focused acoustic field comprises processing the sample according to a programmed procedure selected according to a composition or particle size of the sample.

30. The method of claim 1, wherein exposing the sample to the focused acoustic field comprises acoustically processing the sample under isothermal conditions.

31. The method of claim 1, wherein the focal zone has a shape generated from a transducer having a curved transmitting surface.

32. The method of claim 31, wherein the curved transmitting surface is at least partially spherical or ellipsoidal.

33. The method of claim 1, wherein exposing the sample to the focused acoustic field comprises sterilizing the sample.

34. The method of claim 1, wherein exposing the sample to the focused acoustic field comprises enhancing a reaction within the sample.

35. The method of claim 1, wherein exposing the sample to the focused acoustic field comprises inducing cavitation in the sample.

36. The method of claim 1, further comprising filtering the sample after exposure of the sample to the focused acoustic field.

37. The method of claim 36, wherein the sample comprises a solid and a liquid, and filtering the sample comprises separating the solid from the liquid.

* * * * *

UNITED STATES PATENT AND TRADEMARK OFFICE
CERTIFICATE OF CORRECTION

| | |
|---|---|
| PATENT NO. | : 8,702,836 B2 |
| APPLICATION NO. | : 11/986274 |
| DATED | : April 22, 2014 |
| INVENTOR(S) | : James A. Laugharn, Jr. et al. |

It is certified that error appears in the above-identified patent and that said Letters Patent is hereby corrected as shown below:

In the Claims

Column 17, claim 22, line 46, replace the word "nutlet" with the word -- outlet --

Signed and Sealed this
First Day of July, 2014

Michelle K. Lee
*Deputy Director of the United States Patent and Trademark Office*